July 29, 1969     H. STROHMEIER     3,458,086
ALIGNING APPARATUS FOR CYLINDRICAL WORKPIECES
Filed Dec. 4, 1967
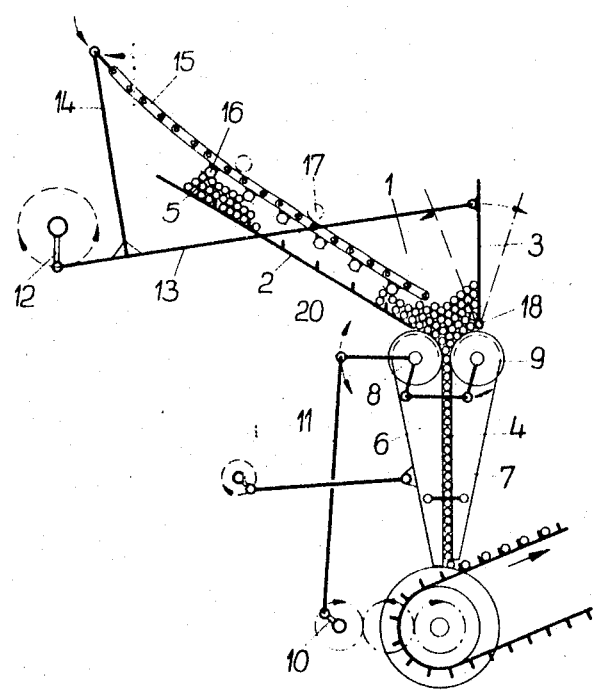
Inventor
Harald Strohmeier
By Hancock, Dowring, Sebald
Attorneys 3,458,086
ALIGNING APPARATUS FOR CYLINDRICAL
WORKPIECES
Harald Strohmeier, Kapfenberg, Austria, assignor to Gebr.
Bohler & Co. Aktiengesellschaft, Vienna, Austria
Filed Dec. 4, 1967, Ser. No. 687,771
Claims priority, application Austria, Dec. 5, 1966,
A 11,186/66
Int. Cl. B65h 9/08; G07f 11/16
U.S. Cl. 221—201                                    9 Claims

ABSTRACT OF THE DISCLOSURE

Apparatus for aligning cylindrical workpieces which has a funnel-type storage bin having at its bottom means for singly receiving the workpieces. The bin has an inclined wall down which the workpieces roll, and above the inclined wall are two or more parallel flexible means positioned normal to the longitudinal axis of the desired workpiece position. The flexible means (chains) have cross members interconnecting them. Further means for moving the flexible means in their longitudinal direction so that the cross members contact and align the workpieces. The cross members may be rods, or fishplate members, and the inclined wall may have studs or notches parallel to the desired positions of the workpieces.

---

This invention relates to an apparatus for aligning cylindrical or rod-like workpieces, such as welding electrodes, wherein the workpieces lie on an inclined surface, e.g. of a funnel.

It is common practice to collect the cylindrical workpieces arriving in large quantity from one operation in a funnel type storage bin and to them feed them successively and singly to another operation. The workpieces roll along the inclined funnel wall to a guide channel, where they are taken up singly and passed on. The workpieces lying one above the other in several layers in bottom of the funnel type bin do not all lie parallel to each other, as desired, but some of the rods lie cross-wise and thus block the guide channel, thereby interrupting the successive flow through the channel. To eliminate this disadvantage, an operator must be assigned whose only function is to assure that all of the cylindrical workpieces are aligned parallel to each other.

To remedy this disadvantage and to enable the mechanical aligning of the workpieces, it is proposed according to the instant invention to provide above the workpieces, and approximately normal to the longitudinal axis of the desired workpiece position, two or more parallelly arranged chains, cables or the like which carry cross rods to aid in the aligning of the workpieces.

The operation of the invention will be explained by way of a preferred embodiment which is represented in the drawing, and shows diagrammatically a conveyor system for the singling of cylindrical workpieces with a funnel. The funnel type storage bin 1 has two opposite walls 2, 3, which are inclined in relation to a guide channel 4 which is approximately adapted to the diameter of the workpieces to be conveyed. Of these two walls of the funnel, one wall 2 is inclined in the manner of an inclined plane, so that the workpieces 5 introduced into the bin can roll along this surface to the guide channel 4. The other wall, 3, is steeper and articulated pivotably about an axis 18. The guide channel 4 consists of two parallel rails 6, 7, at whose upper end, where the workpieces are introduced, rollers 8, 9 are arranged which can be pivoted back and forth by a few degrees of angle by an eccentric 10 in eccentric rhythm via a linkage 11.

Laterally the storage bin an eccentric disk 12 is arranged, to which an eccentric link 13 is articulated. The other end of this link is connected with the bin wall 3, so that this bin wall is pivoted with the eccentric rotation of disk 12.

To the eccentric link 13 there is welded one end of a link 14, to whose other end are fastened two mutually parallel and spaced roller chains 14, which lie over the workpieces on funnel wall 2. One the lower side of the links of these chains 15 and at any desired distance from each other, cross rods 16 are welded which connect the parallel chains. To facilitate engagement of the cross rods 16 with the workpieces, the chains may be interconnected with additional cross rods 17 on the topside of the links, which increase the weight of the chains. The diameter of the cross rods 16 engaging the cylindrical workpieces on wall 2 is advantageously about the same size or greater than the diameter of the workpieces.

The eccentric link 13 is moved back and forth approximately horizontally by the eccentric disc 12. Thereby funnel wall 3 executes a pivotal movement about its axis 18 and pushes the workpieces adjacent this wall parallel to each other and also to the workpieces inlet of the guide channel, thereby aligning the cylindrical workpieces with respect to one another. During the rotation of eccentric disc 12, the eccentric link 13 is moved not only horizontally but also up and down. This movement is participated in by link 14 and with it, by the chains 15 attached to end of the link. Therefore, these chains 15 execute a somewhat gyratory, but essentially rhythmic up and down movement. In so doing, the chains are pulled up out of the storage bin to the extent of the eccentric stroke. After each of these stroke movements the chains fall back into the starting position by its weight and the weight of the weighting rods provided on the chains. With this chain stroke movement, all of the non-parallel cylindrical workpieces lying on wall 2 are, as experience shows, seized by the rods 16 and parallelly aligned under the chain. Experience teaches that even crisis-crossed workpieces are brought into the desired parallel position after some stroke movements.

In cases where the bin wall 3 need not be moved, the chains can be connected with the eccentric directly without interposition of an eccentric link 13. Instead of an eccentric drive, analogously a crank drive or a cam disk can be used to cause the stroke movement of the chains. At adequate inclination of the oblique bin wall 2 and for easy rolling workpieces, it suffices sometimes to maintain the chain motionless, that is, without a continuous stroke movement. As the cylindrical workpieces roll easily, they are brought into the desired position in the course of their own rolling movement by the cross rods 16 of the chains without stroke movement. For resting on the workpieces, chains with fishplate members, or articulated links, such as, for example, roller chains, have proven particularly satisfactory.

It has been found that the aligning of the workpieces can further be improved in that on the inclined bin wall 2, parallel guide channel opening, studs 20 or notches are arranged.

What I claim is:
1. Aligning apparatus for cylindrical workpieces comprising a funnel-type storage bin having at its bottom means for singly receiving said workpieces, said bin having an inclined wall down which said workpieces roll; two or more parallel flexible means juxtaposed said inclined wall and positioned approximately normal to the longitudinal axis of the desired workpiece position; cross members interconnecting said flexible means and positioned to contact said workpieces; and means for moving said flexible means in their longitudinal direction so that said cross members align said workpieces.

2. Aligning apparatus as claimed in claim 1 wherein said flexible means are chains and said cross members are rods whose diameter is at least the same size as said workpieces.

3. Aligning apparatus as claimed in claim 1 wherein said flexible means are chains with fishplate members.

4. Aligning apparatus as claimed in claim 1 wherein said flexible means is a chain having articulated links such as a roller chain.

5. Aligning apparatus as claimed in claim 1 wherein said flexible means are chains and said moving means is an eccentric device.

6. Aligning apparatus as claimed in claim 1 wherein the opposite wall of said bin from said inclined wall is movable toward and away therefrom.

7. Aligning apparatus as claimed in claim 6 wherein said flexible means are chains which are connected to an eccentric disc for moving said chains relative to the inclined wall; the said opposite wall also being connected to said eccentric disc and being synchronously movable with said chains.

8. Aligning apparatus as claimed in claim 1 wherein said inclined wall is provided with studs parallel to the desired position of the workpieces.

9. Aligning apparatus as claimed in claim 1 wherein said inclined wall is provided with notches parallel to the desired positions of the workpieces.

References Cited

UNITED STATES PATENTS

| | | | |
|---|---|---|---|
| 1,195,571 | 8/1916 | Flaherty | 222—243 X |
| 1,281,870 | 10/1918 | Strand | 221—205 |
| 2,076,299 | 4/1937 | Kloess | 221—205 X |
| 2,380,533 | 7/1945 | Lebrecht | 221—205 |
| 3,224,647 | 12/1965 | Dietert et al. | 222—243 X |

FOREIGN PATENTS

| | | |
|---|---|---|
| 1,139,221 | 2/1957 | France. |
| 44,457 | 1/1966 | Germany. |

WALTER SOBIN, Primary Examiner

U.S. Cl. X.R.

221—183, 225; 222—228, 243